Patented July 23, 1940

2,209,065

UNITED STATES PATENT OFFICE 2,209,065

PROCESS OF INTRODUCING DOUBLE BONDS INTO ORGANIC COMPOUNDS CONTAINING HYDROXY GROUPS

Kurt A. F. Pelikan, Jersey City, and Erich F. R. Schuelke, North Bergen, N. J., and John Frederick Gerkens, Brooklyn, N. Y., assignors to Woburn Degreasing Company, Harrison, N. J., a corporation of New Jersey No Drawing. Application January 13, 1937, Serial No. 120,410

4 Claims. (Cl. 260—413)

This invention relates to the process of treating organic compounds containing oxy groups, such as aliphatic hydroxy hydrocarbons and hydroxy acids, for example.

It is already known that catalysts can be used to remove the elements of water that is, the H—OH group, from the glycerides of ricinoleic acid (castor oil), where the carboxyl groups were protected.

We have discovered that bleaching earths, consisting mostly of hydrosilicates, such as those commonly known as "Tonsil" for example, are of especial benefit as a catalyst for the removal of H—OH groups when used in compounds where there are free carboxyl groups and hydroxy groups present in the same molecule. It is well known that when carboxyl groups are in an unprotected state, the compounds having OH groups are liable to form interlinking products, such as lactones, anhydrides, estolides, polyesters, etc. "Tonsil" is, chemically, a hydrated magnesium aluminum silicate. Physically it is an earth of the clay type having a special structure caused by treatment with acid. The acid leaches out certain constituents and produces a highly activated material which has been found of special advantage according to the present invention.

Our invention is particularly applicable, for example, to oxidation products obtained during the oxidation of paraffins. It is known that where the manufacturing of fatty acids from paraffins is carried on more or less of acids or oxy acids or other oxy compounds are produced according to the variations of the paraffin oxidation process. Such oxidation processes can be carried out so as to obtain a comparatively large amount of hydroxy acids, hydroxy paraffins and other paraffin oxy compounds, and we have found that when they are treated with an acid bleaching earth unsaturated hydrocarbons and unsaturated acids, etc. are produced. This invention also includes the treatment of such compounds.

We have found that, for instance, in a special case, such as ricinoleic acid (that is, 12-oxy, 9-octa decenoic acid-1), by the addition of about 10% by weight of "Tonsil" and subsequent heating to about 230 to about 250° C. we can accomplish the removal of the H—OH groups and thereby the introduction of new double bonds with very little, if any, interference with the carboxyl groups.

The unsaturated acids, for instance, obtained by this invention are particularly useful as a base for the synthesis of new resins of the alkyd type, such as are used for making varnishes, paints, lacquers, etc., and also in the synthesis of plasticizers, plastics, etc. They can be used in any similar cases where special fastness to light and color retention is desirable and where the combinations in the above-mentioned synthetic products require improved properties.

We have found that it is preferable to have the catalyst in a finely divided state before it is mixed with the fatty acid. It may be finely divided, for example, by means of a pebble mill or colloid mill, having been first mixed with a portion of the medium that is to be treated with it. This catalyst may be mixed with the fatty acid to be treated either before or after the acid has been heated and the amount of the catalyst can be varied over wide ranges, depending upon the particular compound to be treated. The time of treatment also varies from about half an hour to several hours, depending upon the particular compound that is being treated and the quantity of the same. The extent of reaction desired can usually be determined by the foaming ceasing or practically ceasing, and also by determining the point at which the iodine number has reached a maximum.

The following are given as specific examples to illustrate the invention, but it is to be understood that the invention is not restricted to the particular examples.

*Example I.*—150 parts by weight of ricinoleic acid were mixed with 30 parts of the acid bleaching earth known as "Tonsil" and heated while maintaining a vacuum below 30 mm. absolute pressure while the temperature was increased from 25° C. to about 200° C. in about 1 to 5 minutes and was maintained at about 200° C. for about an hour more. Agitation was maintained during the heating by passing nitrogen through the mixture. The reaction product was then allowed to cool while maintaining the vacuum and was then separated from the "Tonsil" by diluting with petroleum ether and filtering. After the removal of the solvent the clear, rather viscous, light golden colored, unsaturated fatty acids were distilled with superheated steam under vacuum. The final product showed an acid number 180, saponification number 193, and a Hanus iodine number (1 hour) 176, and a Wijz iodine number (45 minutes) 145.

*Example II.*—50 pounds of ricinoleic acid and 5 pounds of "Tonsil" were heated together at a vacuum below 30 mm. for about 3 hours, during which time the temperature gradually increased from 25° C. to 250° C. The products were mechanically agitated during the reaction and a current of carbon dioxide was used to prevent oxidation during the subsequent cooling of the products. A filtering medium was then used. We found that 2½% of the filtering medium known as "Hyflo Supercel" added to the reaction products rendered the same easily filtered in a filter press. "Hyflo Supercel" is a porous cellular diatomaceous silica. The filtered product was light colored and of medium viscosity. It had an acid number of 179, a saponification number 186, Hanus iodine number (1 hour) 164, Wijz iodine number (45 minutes) 144, and a viscosity of 5.4 sec. at 25° C. by the A. S. T. M. falling ball method.

*Example III.*—1000 parts of a mixture of higher alcohols consisting principally of cetyl and stearyl alcohol (Hanus iodine number 12.6) were mixed with 10 parts of "Tonsil" and heated at atmospheric pressure while passing nitrogen therethrough for agitating the mixture. The heating was such that the temperature rapidly reached 250° C. and was continued at that point for 30 minutes, whereupon a large part of the unsaturated hydrocarbons that formed was distilled over together with the water that was split off during the reaction. Upon separating the water the distillate was a clear white liquid at 25° C. The residue in the heating vessel was extracted with petroleum ether and filtered to remove the catalyst, whereupon a small amount of a straw colored fluorescent liquid was obtained from the residue. The hydrocarbon distillalte had a Hanus iodine number (1 hour) of 104 and an acid number of 1.7. The residue had a Hanus iodine number (1 hour) of 83.

*Example IV.*—1000 parts by weight of hydroxy fatty acids, derived from unsaturated vegetable oils by sulphonation and hydrolysis of the $SO_3H$ group, having an acid number of 179, a Hanus iodine number of 79 and an acetyl value of 33, were mixed with 10% of "Tonsil' and heated under a vacuum below 30 mm. for 40 minutes at 220–265° C. with nitrogen agitation. After cooling and filtering a fatty acid mixture was obtained, having an acid number of 161, a Hanus iodine number of 108 and an acetyl value below 2.

We claim:

1. The process which comprises mixing intimately a major proportion of a higher hydroxy fatty acid having a long chain of carbon atoms, with a minor proportion of "Tonsil," and heating said mixture in the liquid phase to temperatures at which a catalytic splitting out of water occurs without substantial pyrolytic decomposition.

2. The process which comprises rapidly heating a higher hydroxy fatty acid incorporated with Tonsil to a temperature of about 200 to 250° C., the time of heating being sufficiently short to avoid any substantial pyrolytic decomposition, and thereafter maintaining the heated mixture within said temperature range whereby water is split out and distilled, until said splitting out of water and distillation is substantially completed.

3. The process which comprises rapidly heating a higher hydroxy fatty acid incorporated with Tonsil to a temperature of about 200 to 250 C., the time of heating being sufficiently short to avoid any substantial pyrolytic decomposition, and thereafter maintaining the heated mixture within said temperature range at reduced pressure whereby water is split out and distilled, until said splitting out of water and distillation is substantially completed.

4. The process which comprises rapidly heating a higher hydroxy fatty acid incorporated with Tonsil to a temperature of about 200 to 250° C., the time of heating being sufficiently short to avoid any substantial pyrolytic decomposition, and thereafter maintaining the heated mixture within said temperature range at reduced pressure in an inert atmosphere whereby water is split out and distilled, until said splitting out of water and distillation is substantially completed.

KURT A. F. PELIKAN.
ERICH F. R. SCHUELKE.
JOHN FREDERICK GERKENS.